A. M. COX.
GROUND CUTTER AND PULVERIZER.
APPLICATION FILED JULY 26, 1912.
1,103,741.
Patented July 14, 1914.
2 SHEETS—SHEET 1.
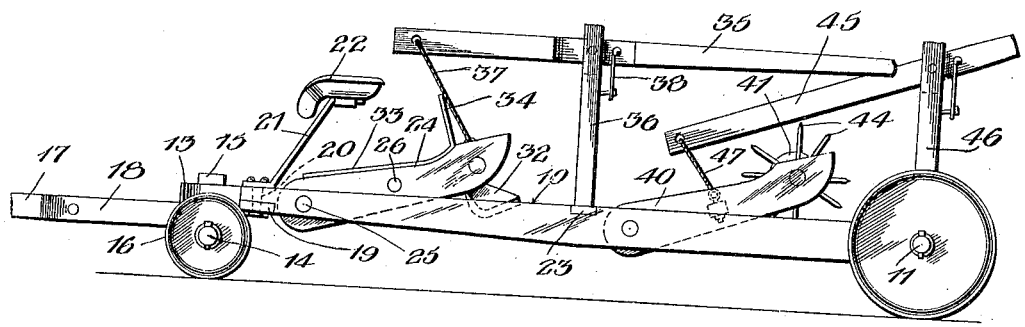
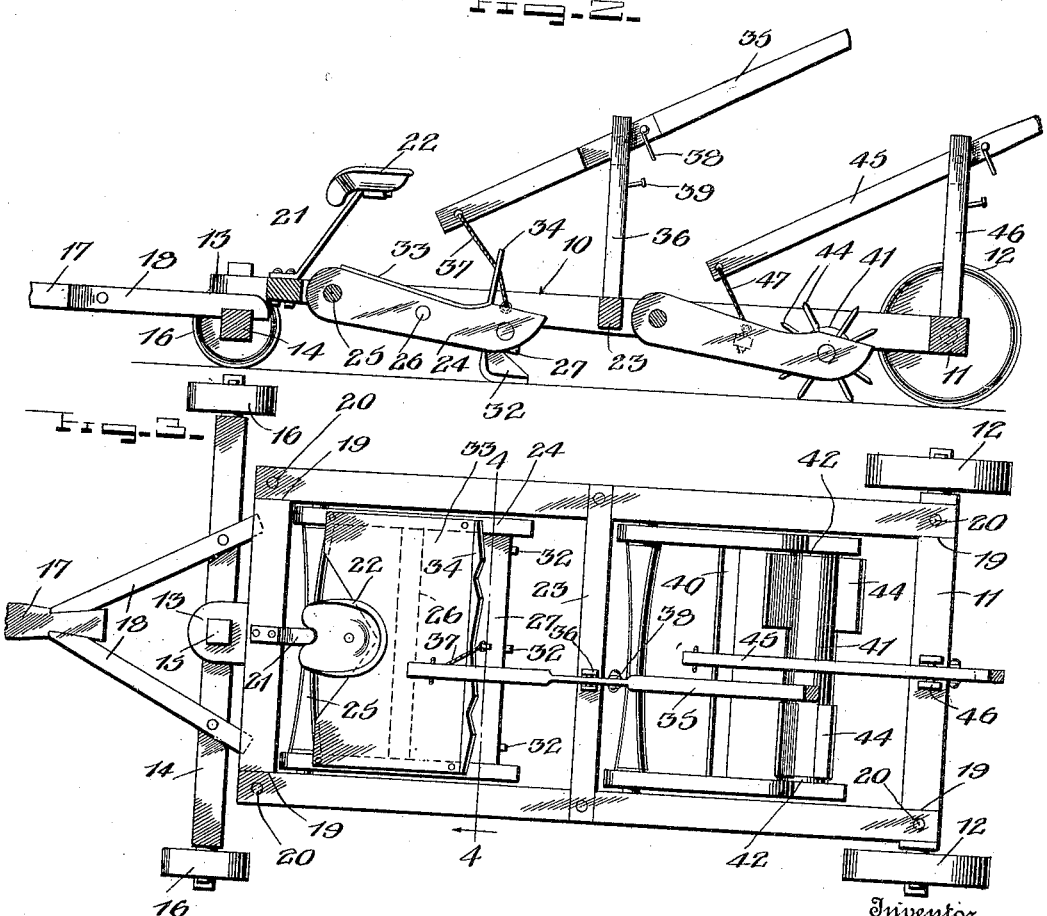
Witnesses
W. H. Rockwell
J. E. Burch
Inventor
A. M. Cox
By 
Attorneys.

A. M. COX.
GROUND CUTTER AND PULVERIZER.
APPLICATION FILED JULY 26, 1912.
1,103,741.
Patented July 14, 1914.
2 SHEETS—SHEET 2.
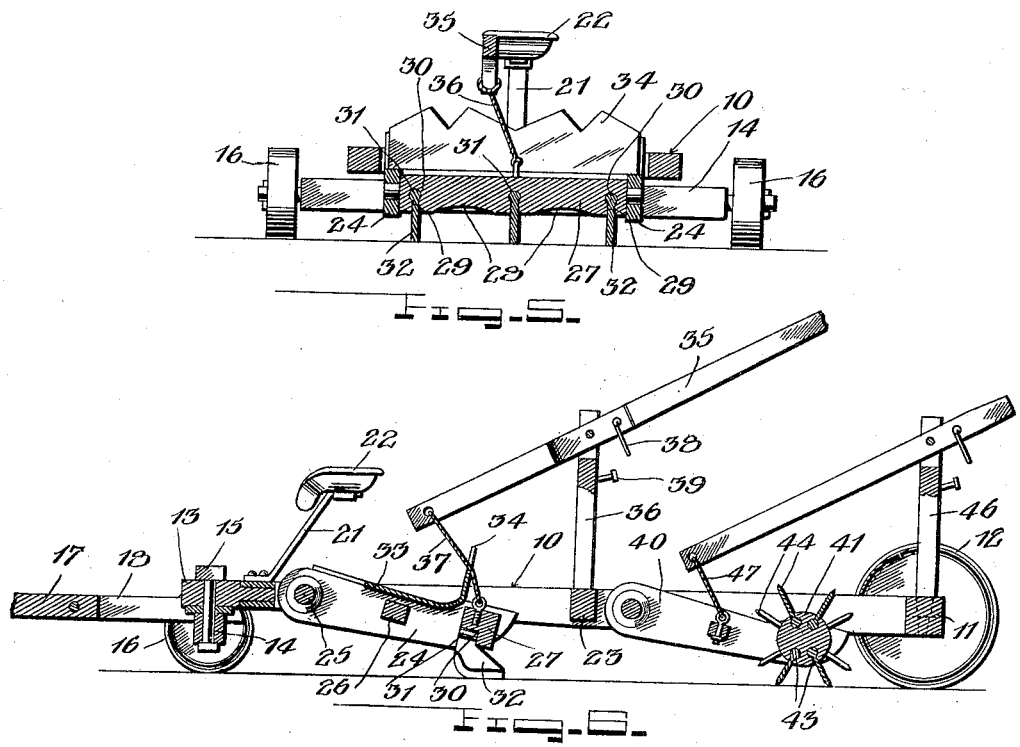
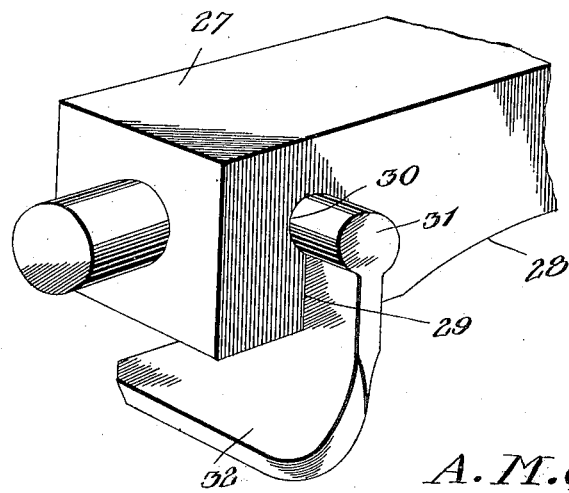
Witnesses
W. H. Rockwell
J. F. Burch.
Inventor
A. M. Cox
By Chandler Chandler
Attorneys

UNITED STATES PATENT OFFICE.

ALBERT M. COX, OF MATTIE, SOUTH CAROLINA.

GROUND CUTTER AND PULVERIZER.

1,103,741.

Specification of Letters Patent. Patented July 14, 1914.

Application filed July 26, 1912. Serial No. 711,670.

*To all whom it may concern:*

Be it known that I, ALBERT M. COX, a citizen of the United States, residing at Mattie, in the county of Horry, State of South Carolina, have invented certain new and useful Improvements in Ground Cutters and Pulverizers; and I do hereby declare the following to be a full, clear, and exact description of the invention, such as will enable others skilled in the art to which it appertains to make and use the same.

This invention relates to farm implements and more particularly to an improved ground cutter and soil pulverizer.

The essential purpose of the invention is involved in the provision of an improved implement or machine of this character to be drawn by horses or other draft animals and intended for the breaking up of the ground, especially rough and uncleared ground, so that the ground will be cut transversely and longitudinally at one advancement of the machine across a field.

Another object resides in the provision of cutting devices which may be readily assembled or disassembled and which are of such simplicity as to conduce to durability and strength and to economy in manufacture.

With the above and other objects in view the invention consists of certain other combinations and arrangements of parts, as will be hereinafter more fully described, claimed and illustrated in the accompanying drawings, in which:

Figure 1 is a side elevation of my improved ground cutter and pulverizer with the parts in a raised or inoperative position. Fig. 2 is a longitudinal sectional view taken inwardly of one side beam with the implement part in an operative position. Fig. 3 is a top plan view. Fig. 4 is a cross sectional view taken on the line 4—4 of Fig. 3. Fig. 5 is a central longitudinal sectional view of the machine. Fig. 6 is an enlarged detail view showing the manner of attaching one of the cutting blades.

As illustrated, my improved ground cutter and pulverizer embodies a rectangular supporting frame 10, the rear end of which forms the rear axle 11 having ground wheels 12 mounted on its ends while the forward end of the machine has a bearing projection 13 pivoted to the front axle 14 by a king bolt 15 and ground wheels 16 are mounted on the ends of the front axle to provide a wheeled frame for supporting the working parts. A tongue 17 is connected to the front axle by the usual hounds 18 which secure the same rigid therewith for turning the front axle by suitable draft animals so that the front wheels can turn at comparatively sharp angles to avoid stumps or other obstructions.

The corners of the supporting frame are mortised as shown at 19 and secured in overlapped relation through the medium of wedge pins 20 so as to securely lock and hold the parts of the frame together. A seat standard 21 is mounted on the front end member of the frame and supports a seat 22 for the driver and the central portion of the frame is connected by a cross brace 23 which considerably reinforces the frame structure.

A cutting device for cutting the soil in the direction of travel of the machine, is arranged at the forward end thereof and comprises side arms 24 mounted at their forward ends for pivotal movement upon the reduced extremities of a transverse pivot 25, such extremities being engaged in transversely alined apertures in the side beams of the frame. The arms 23 are connected intermediate their ends by the cross brace 26 and at their rear ends by a cutter bar 27 which are secured rigidly to the arms, while the cutter bar is provided with spaced recesses 28 in its bottom face providing an intermediate and end enlargement having recesses 29 communicating with their forward and bottom faces. These recesses are provided with enlarged circular upper portions 30 and are adapted to receive similarly shaped heads 31 of rearwardly extending cutting knives or blades 32 adapted to cut the soil.

The pivoted supplemental frame thus provided for the cutters 32 which are removably attached as described, is provided with a platform 33 having a rear vertical retaining portion 34 for the retention of suitable weights mounted on the platform for embedding the knives in the ground, especially when the latter is rough. An operating lever 35 is centrally mounted in the upper forked extremity of a standard 36 centrally mounted on the cross brace 23 and has its forward extremity connected by a flexible member 37 to the cutter bar while the rear extremity of the lever extends slightly beyond the rear end of the frame for manipulation to raise and lower the cutter blades. A depending link 38 is secured to the lever rearwardly of the standard and engages a pin 39 carried by the standard for holding the lever in a lowered position and the blades out of contact with the ground, while said link may be swung to a disengaged position for lowering the blades.

A similarly constructed supplemental frame 40 is pivoted rearwardly of the cross brace 23 except that the rear ends of the arms, which in both instances are curved on their under edges to prevent them from projecting into the earth, rotatably support a pulverizing wheel 41 embodying a cylinder having removable end plates 42 closing the extremities of recesses 43 extended longitudinally of opposite ends of the cylinder or drum, spaced apart centrally and arranged in staggered relation for removably securing cutting blades 44 therein. These blades extend radially from the cylinder and at a slight angle to the direction of rotation thereof to cut and pulverize the soil behind and transversely of the direction of operation of the cutting blades.

A lever 45 is pivotally mounted upon a standard 46 carried centrally of the rear axle and beneath the lever 35 and is connected at its forward extremity by a flexible member 47 to the cross brace of the supplemental frame 40 and provided with a similar link and pin for holding the lever in position with the blades in or out of contact with the ground as desired.

From the foregoing description in connection with the accompanying drawings, it will be evident that the cutting devices may be raised or lowered during the advancement of the machine and since the weight may be increased or decreased, the machine may be made to accommodate the particular condition of the soil.

The device is especially useful over the ordinary single cutter or disk harrow and the pulverization of the soil to insure better crops may be accomplished much more rapidly.

I claim:

1. In a pulverizing machine, the combination of implement holding members having recesses provided with interior circular enlargements and cutting implements having similarly shaped necks and head portions removably engaged in said recesses.

2. In a ground cutter and pulverizer, an implement holding member having recesses cut in its face adjacent the ground, each of said recesses also opening upon an adjacent side of the member, each of said recesses being provided with interior circular enlargements and cutting implements having similarly shaped neck and head portions removably engaged in said recesses, and said recesses being so disposed that when the machine is assembled and in operation, the heads of the cutting implements are securely held in said enlargements.

In testimony whereof, I affix my signature, in presence of two witnesses.

ALBERT M. COX.

Witnesses:
N. J. Cox,
S. C. James.

Copies of this patent may be obtained for five cents each, by addressing the "Commissioner of Patents, Washington, D. C."